US012631794B2

(12) United States Patent
Kawai et al.

(10) Patent No.: US 12,631,794 B2
(45) Date of Patent: May 19, 2026

(54) TRANSPARENT SUBSTRATE WITH MULTILAYER FILM AND IMAGE DISPLAY DEVICE

(71) Applicant: AGC Inc., Tokyo (JP)

(72) Inventors: Keisuke Kawai, Tokyo (JP); Kaname Seto, Tokyo (JP); Katsumi Suzuki, Tokyo (JP); Tomoyuki Arae, Tokyo (JP); Kazuya Takemoto, Tokyo (JP)

(73) Assignee: AGC Inc., Tokyo (JP)

( * ) Notice: Subject to any disclaimer, the term of this patent is extended or adjusted under 35 U.S.C. 154(b) by 362 days.

(21) Appl. No.: 18/454,885

(22) Filed: Aug. 24, 2023

(65) Prior Publication Data

US 2023/0408731 A1      Dec. 21, 2023

Related U.S. Application Data

(63) Continuation of application No. PCT/JP2022/005613, filed on Feb. 14, 2022.

(30) Foreign Application Priority Data

Feb. 26, 2021    (JP) ................................. 2021-030879

(51) Int. Cl.
*G02B 1/115*          (2015.01)
*C03C 17/34*          (2006.01)

(52) U.S. Cl.
CPC .......... *G02B 1/115* (2013.01); *C03C 17/3417* (2013.01)

(58) Field of Classification Search
CPC .... G02B 1/115; C03C 17/3417; C23C 14/083
See application file for complete search history.

(56) References Cited

U.S. PATENT DOCUMENTS 5,147,125 A  *  9/1992  Austin ................... G02B 1/115
                                            359/359
5,691,044 A     11/1997  Oyama et al.
                        (Continued)

FOREIGN PATENT DOCUMENTS

CN          104937443 A  *  9/2015  .............. F24S 70/30
JP          9-156964 A      6/1997
                  (Continued)

OTHER PUBLICATIONS

International Search Report issued May 10, 2022 in PCT/JP2022/005613 filed on Feb. 14, 2022, 2 pages.

(Continued)

*Primary Examiner* — Ricky L Mack
*Assistant Examiner* — Natasha Nigam
(74) *Attorney, Agent, or Firm* — Oblon, McClelland, Maier & Neustadt, L.L.P.

(57)              ABSTRACT

The present invention relates to a transparent substrate with a multilayer film including: a transparent substrate having two main surfaces; and a multilayer film obtained by laminating at least two or more layers having refractive indices different from each other, and disposed on or above at least one main surface of the transparent substrate, in which the multilayer film includes one or more silicon oxide layers, and at least one layer of the one or more silicon oxide layers has a refractive index of $1.460 \leq n < 1.478$ at a wavelength of 550 nm.

8 Claims, 1 Drawing Sheet

(56) References Cited

U.S. PATENT DOCUMENTS

| | | | | |
|---|---|---|---|---|
| 5,930,046 | A * | 7/1999 | Solberg | C23C 14/10 |
| | | | | 359/582 |
| 5,942,319 | A | 8/1999 | Oyama et al. | |
| 10,928,555 | B2 * | 2/2021 | Fujii | C23C 16/4411 |
| 11,021,392 | B2 * | 6/2021 | Fujii | C03C 17/3639 |
| 2005/0219724 | A1 * | 10/2005 | Teramoto | G02B 1/113 |
| | | | | 359/883 |
| 2008/0199671 | A1 | 8/2008 | Miyagi et al. | |
| 2017/0170199 | A1 | 6/2017 | Zhang | |
| 2017/0204000 | A1 * | 7/2017 | Varanasi | B32B 17/10201 |
| 2018/0203354 | A1 | 7/2018 | Fujii | |
| 2019/0079339 | A1 * | 3/2019 | Fujii | G02B 1/115 |
| 2019/0285775 | A1 * | 9/2019 | Zieba | C03C 17/3417 |
| 2020/0018872 | A1 | 1/2020 | Fujii et al. | |
| 2020/0123049 | A1 | 4/2020 | Fujii | |

FOREIGN PATENT DOCUMENTS

| | | | |
|---|---|---|---|
| JP | 2008-201633 | A | 9/2008 |
| JP | 2012-73542 | A | 4/2012 |
| JP | 2016-68470 | A | 5/2016 |
| JP | 2018-115105 | A | 7/2018 |
| JP | 2020-6651 | A | 1/2020 |

OTHER PUBLICATIONS

Extended European Search Report issued Feb. 3, 2025 in European Patent Application No. 22759410.8, 10 pgs.

* cited by examiner

TRANSPARENT SUBSTRATE WITH MULTILAYER FILM AND IMAGE DISPLAY DEVICE

TECHNICAL FIELD

The present invention relates to a transparent substrate with a multilayer film and an image display device.

BACKGROUND ART

In recent years, from the viewpoint of aesthetics, a method of installing a cover glass on a front surface of an image display device such as a liquid crystal display has been used. However, glare due to reflection of external light by the cover glass is a problem, and in order to solve such a problem, a multilayer film having a laminated structure is often installed on a surface of the cover glass. However, in an antireflection film in the related art, a boundary line between a black frame portion and an image display portion of the image display device is conspicuous, resulting in poor aesthetics.

Therefore, it is known that by imparting a light absorption ability to the antireflection film, which is a multilayer film in which at least two or more dielectric layers having refractive indices different from each other are laminated, the boundary line between the black frame portion and the image display portion of the image display device can be made inconspicuous, and reflection from an interface between the cover glass and the antireflection film can also be prevented. For example, Patent Literature 1 discloses a transparent substrate with an antireflection film, which has a light absorption ability and an insulating property. Patent Literature 2 discloses a transparent conductive laminate in which a silicon oxide layer and a copper layer are laminated in order. Patent Literature 3 discloses an antireflection film in which a coating made of a high refractive index material and a coating made of a low refractive index material are provided on a surface of a glass plate, and the coating made of a low refractive index material is disposed on an outermost surface.

CITATION LIST

Patent Literature

Patent Literature 1: JP2018-115105A
Patent Literature 2: JP2016-068470A
Patent Literature 3: JP2008-201633A

SUMMARY OF INVENTION

Technical Problem

As described above, there is known a technique of imparting a light absorption ability to the multilayer film to provide aesthetics and to prevent the reflection from the interface between the cover glass and the multilayer film. However, in a transparent substrate with a multilayer film in the related art, a transmittance of the multilayer film sometimes changes under a high-temperature environment or a high-temperature and high-humidity environment. Therefore, an object of the present invention is to provide a transparent substrate with a multilayer film in which a change in transmittance of a multilayer film under a high-temperature environment or a high-temperature and high-humidity environment is prevented, and an image display device including the transparent substrate with a multilayer film.

Solution to Problem

The present inventors have found that in the case where the multilayer film includes a predetermined configuration, the above problems can be solved, and have thus completed the present invention. That is, the gist of the present invention is as follows.

1. A transparent substrate with a multilayer film including:
   a transparent substrate having two main surfaces; and
   a multilayer film obtained by laminating at least two or more layers having refractive indices different from each other, and disposed on or above at least one main surface of the transparent substrate, in which
   the multilayer film includes one or more silicon oxide layers, and
   at least one layer of the one or more silicon oxide layers has a refractive index of $1.460 \leq n < 1.478$ at a wavelength of 550 nm.

2. The transparent substrate with a multilayer film according to item 1, in which the multilayer film further includes a metal oxide layer,
   the metal oxide layer is mainly formed of a mixed oxide including an oxide of at least one selected from a group A consisting of Mo and W and an oxide of at least one selected from a group B consisting of Si, Nb, Ti, Zr, Ta, Al, Sn, and In, and
   in the metal oxide layer, a content of an element in the group B contained in the mixed oxide is less than 80 mass % with respect to a total of an element in the group A contained in the mixed oxide and the element in the group B contained in the mixed oxide.

3. A transparent substrate with a multilayer film including:
   a transparent substrate having two main surfaces; and
   a multilayer film obtained by laminating at least two or more layers having refractive indices different from each other, and disposed on or above at least one main surface of the transparent substrate, in which
   the multilayer film includes one or more first metal oxide layers,
   at least one layer of the one or more first metal oxide layers is sandwiched and laminated between two second metal oxide layers,
   the second metal oxide layers sandwiching the first metal oxide layer each have a film thickness of 8 nm or more,
   the one or more first metal oxide layers are each a layer being mainly formed of a mixed oxide including Mo and Nb and having an extinction coefficient k of greater than 0.004 at a wavelength of 550 nm, and
   the second metal oxide layers are each a layer being mainly formed of a mixed oxide including Mo and Nb and having an extinction coefficient k of 0.004 or less at the wavelength of 550 nm.

4. The transparent substrate with a multilayer film according to item 3, in which the multilayer film further includes a silicon oxide layer, and
   a content of an element in a group B consisting of Si, Nb, Ti, Zr, Ta, Al, Sn, and In is less than 80 mass % with respect to a total of an element in a group A consisting of Mo and W and the element in the group B contained in the first metal oxide layer.

5. The transparent substrate with a multilayer film according to any one of items 1 to 4, further including an antifouling film on or above the multilayer film.

6. The transparent substrate with a multilayer film according to any one of items 1 to 5, in which the transparent substrate is a glass substrate or a resin substrate.

7. The transparent substrate with a multilayer film according to any one of items 1 to 5, in which the transparent substrate is a laminate including a glass and a resin substrate.

8. The transparent substrate with a multilayer film according to item 6 or 7, in which the glass is chemically strengthened.

9. The transparent substrate with a multilayer film according to any one of items 1 to 8, in which the transparent substrate is subjected to an anti-glare treatment on the main surface having the multilayer film.

10. An image display device including the transparent substrate with a multilayer film according to any one of items 1 to 9.

Advantageous Effects of Invention

According to the present invention, when the multilayer film includes a predetermined configuration, it is possible to provide a transparent substrate with a multilayer film in which a change in transmittance of the multilayer film under a high-temperature environment or a high-temperature and high-humidity environment is prevented, and an image display device including the transparent substrate with a multilayer film.

DESCRIPTION OF EMBODIMENTS

Figure 1:
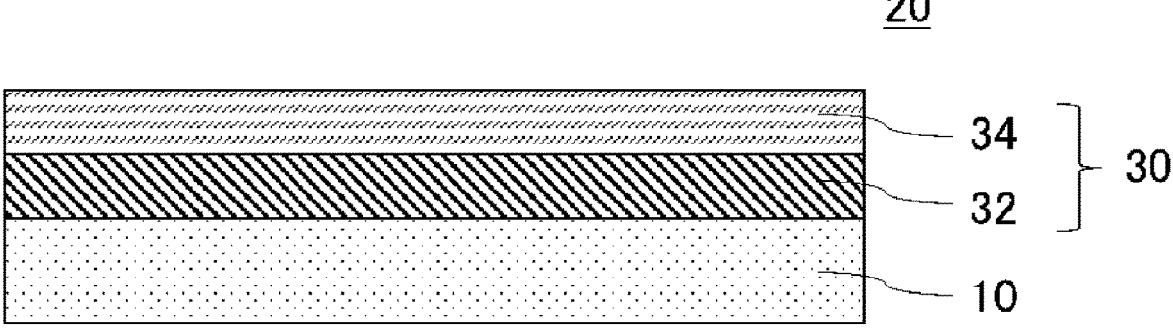
FIG. 1 is a cross-sectional view schematically showing one configuration example of a transparent substrate with a multilayer film according to a first aspect.

Hereinafter, embodiments of the present invention will be described in detail with reference to the drawings.
(Transparent Substrate with Multilayer Film)

A transparent substrate with a multilayer film according to the present embodiment includes: a transparent substrate having two main surfaces; and a multilayer film obtained by laminating at least two or more layers having refractive indices different from each other, and disposed on or above at least one main surface of the transparent substrate.

The transparent substrate with a multilayer film according to the present embodiment preferably has a luminous transmittance of 20% to 89%. In the case where the luminous transmittance is within the above range, an appropriate light absorption ability is obtained. Therefore, in the case where the transparent substrate with a multilayer film is used as a cover glass for an image display device, reflection from an interface between the cover glass and the multilayer film can be prevented. Accordingly, a bright contrast of the image display device is improved. Note that the luminous transmittance can be measured by the method specified in JIS Z 8709 (1999). The luminous transmittance of the transparent substrate with a multilayer film according to the present embodiment is more preferably 50% to 89%, and still more preferably 65% to 85%.

In the case where the transparent substrate with a multilayer film according to the present embodiment has a configuration described below, a change in transmittance under a high-temperature environment is prevented. Specifically, for example, an absolute value of a change in transmittance Δ Tv before and after holding for 500 hours in an environment at a temperature of 95° C. is preferably 2.0% or less, and more preferably 1.0% or less. Note that the Δ Tv is a value determined by the method described in Examples below using a spectrophotometer.

In the case where the transparent substrate with a multilayer film according to the present embodiment has the configuration described below, a change in transmittance under a high-temperature and high-humidity environment is prevented. Specifically, for example, an absolute value of a change in transmittance Δ Tv before and after holding for 500 hours in an environment at a temperature of 85° C. and a humidity of 85% RH is preferably 2.0% or less, and more preferably 1.0% or less. Note that the Δ Tv is a value determined by the method described in Examples below using a spectrophotometer.

In the transparent substrate with a multilayer film according to the present embodiment, the multilayer film preferably has a sheet resistance of $10^4$ Ω/sq. or more. In the case where the sheet resistance of the multilayer film is within the above range, the multilayer film has an insulating property. Therefore, in the case where the transparent substrate with a multilayer film is used as a cover glass for an image display device, even when a touch panel function is imparted, a change in capacitance due to finger contact, which is necessary for a capacitive touch sensor, is maintained, and the touch panel can function. Note that the sheet resistance can be measured by the method specified in ASTM D257 or JIS K 6271-6 (2008). In the transparent substrate with a multilayer film according to the present embodiment, the sheet resistance of the multilayer film is more preferably $10^6$ Ω/sq. or more, still more preferably $10^8$ Ω/sq. or more, and even more preferably $10^{11}$ Ω/sq. or more.

In the transparent substrate with a multilayer film according to the present embodiment, the multilayer film preferably has a luminous reflectance of 1% or less. In the case where the luminous reflectance is within the above range and the transparent substrate with a multilayer film is used as a cover glass for an image display device, an effect of preventing reflection of external light on a screen can be improved. Note that the luminous reflectance can be measured by the method specified in JIS Z 8701 (1999). The luminous reflectance is more preferably 0.8% or less, and still more preferably 0.6% or less. A lower limit value of the luminous reflectance is not particularly specified, and is preferably 0.05% or more or 0.1% or more, for example.

The transparent substrate with a multilayer film according to the present embodiment preferably has a b* value of 5 or less in transmission color under a D65 light source. In the case where the b* value is within the above range, transmitted light is not yellowish, so that it is suitable for use as a cover glass for an image display device. Note that the b* value in transmission color under a D65 light source can be measured by the method specified in JIS Z 8729 (2004). The b* value is more preferably 3 or less, and still more preferably 2 or less. The b* value is preferably −6 or more, and more preferably −4 or more. Being within the above range is preferred since the transmitted light tends to be colorless and the transmitted light is not hindered.
(Multilayer Film)

The transparent substrate with a multilayer film according to the present embodiment includes: a transparent substrate having two main surfaces; and a multilayer film obtained by laminating at least two or more layers having refractive indices different from each other, and disposed on or above at least one main surface of the transparent substrate. The multilayer film has the following first aspect or second aspect.

First Aspect

A multilayer film in a transparent substrate with a multilayer film according to the first aspect of the present embodiment preferably has the following configuration.

In the first aspect, the multilayer film includes one or more silicon oxide layers, and at least one layer of the one or more silicon oxide layers has a refractive index n of $1.460 \leq n < 1.478$ at a wavelength of 550 nm.

FIG. 1 is a cross-sectional view schematically showing one configuration example of the transparent substrate with a multilayer film according to the first aspect. In a transparent substrate with a multilayer film 20 in FIG. 1, a multilayer film 30 is formed on a transparent substrate 10. The multilayer film 30 shown in FIG. 1 has a laminated structure in which two dielectric layers 32 and 34 are laminated as layers having refractive indices different from each other. In the case where the dielectric layers 32 and 34 having refractive indices different from each other are laminated, light reflection can be prevented. In the example in FIG. 1, the dielectric layer 32 is a high refractive index layer and the dielectric layer 34 is a low refractive index layer. Note that the expression "having refractive indices different from each other" used here preferably means that the refractive index n at a wavelength of 550 nm differs by 0.2 or more, for example. In addition, the high refractive index layer is, for example, a layer having a refractive index n of 1.8 or more at a wavelength of 550 nm, and the low refractive index layer is, for example, a layer having a refractive index n of 1.6 or less at a wavelength of 550 nm.

The multilayer film includes one or more silicon oxide layers each mainly formed of $SiO_x$, and at least one layer of the one or more silicon oxide layers has a refractive index n of $1.460 \leq n < 1.478$ at a wavelength of 550 nm. For example, in the configuration in FIG. 1, the dielectric layer 34 is a silicon oxide layer, and the refractive index n of the silicon oxide layer is $1.460 \leq n < 1.478$ at a wavelength of 550 nm. Note that, in the present description, the expression "mainly formed of a specific component" means 70 mass % or more of the specific component is contained.

It is presumed that the change in transmittance under a high-temperature environment and a high-temperature and high-humidity environment is due to a change in transmittance of the multilayer film caused by, for example, a redox reaction occurring in the multilayer film under such an environment. Specifically, the following reasons are conceivable.

A preferred configuration of the multilayer film in the present embodiment includes, for example, a configuration in which a silicon oxide layer and a metal oxide layer are laminated in this order. It is conceivable that, in such a configuration, a degree of oxidation of the silicon oxide layer may increase and a degree of oxidation of the metal oxide layer may decrease due to a redox reaction between the silicon oxide layer and the metal oxide layer under a high-temperature environment and a high-temperature and high-humidity environment. In the case where the degree of oxidation of the metal oxide layer decreases, an absorption coefficient of the metal oxide layer increases and the transmittance of the multilayer film decreases. It is conceivable that, particularly under a high-temperature and high-humidity environment, the presence of moisture facilitates the progress of such a redox reaction.

On the other hand, it is conceivable that, in the above configuration, in the case where the metal oxide layer easily reacts with oxygen from the outside under a high-temperature environment and a high-temperature and high-humidity environment, such a reaction increases the degree of oxidation of the metal oxide layer and increases the transmittance of the multilayer film.

Here, it is known that the degree of oxidation and the refractive index of $SiO_x$ are correlated, and that the higher the degree of oxidation is, the smaller the value of the refractive index n at a wavelength of 550 nm is. The present inventors have found that in the case where the degree of oxidation of $SiO_x$ in the silicon oxide layer is adjusted and the multilayer film includes a silicon oxide layer having a value of n within a specific range, the change in transmittance of the multilayer film under a high-temperature environment and a high-temperature and high-humidity environment can be prevented.

That is, it is conceivable that, in the case where n of the silicon oxide layer is less than the above value and the degree of oxidation is relatively large, $SiO_x$ is less likely to be oxidized under a high-temperature environment and a high-temperature and high-humidity environment, and a decrease in transmittance of the multilayer film can be prevented. The value of n is less than 1.478, and preferably 1.464 or less. On the other hand, in the case where the degree of oxidation of $SiO_x$ is greater than a certain level, or in the case where $SiO_x$ is completely oxidized, the silicon oxide layer is relatively easy to transmit an oxygen gas or water vapor. Therefore, it is conceivable that in the case where n is 1.460 or more, transmission of an oxygen gas or water vapor can be prevented, and an increase in transmittance of the multilayer film can be prevented.

A film thickness of the silicon oxide layer is not particularly limited, and is preferably nm or more, and more preferably 60 nm or more, from the viewpoint of low reflection characteristics, for example. In addition, a total film thickness of the silicon oxide layers is preferably 1000 nm or less, and more preferably 800 nm or less, from the viewpoint of productivity.

The multilayer film preferably further includes the metal oxide layer as described above, since it is easy to obtain an insulating film having a desired light absorption ability. The metal oxide layer is more preferably a metal oxide layer mainly formed of a mixed oxide containing an oxide of at least one selected from a group A consisting of Mo and W and an oxide of at least one selected from a group B consisting of Si, Nb, Ti, Zr, Ta, Al, Sn, and In. For example, in the multilayer film 30 shown in FIG. 1, the dielectric layer 32 is preferably a metal oxide layer, and more preferably a metal oxide layer mainly formed of the above mixed oxide.

In addition, the metal oxide layer is preferably amorphous. In the case where the metal oxide layer is amorphous, it can be prepared at a relatively low temperature, so that in the case where the transparent substrate is a resin substrate or the like, the transparent substrate can be prevented from being damaged by heat.

In the case where the metal oxide layer is mainly formed of the mixed oxide described above, among elements constituting the mixed oxide, Mo is preferable as the group A, and Nb is preferable as the group B. That is, the above metal oxide layer is more preferably a layer mainly formed of a mixed oxide containing Mo and Nb. In the related art, an oxygen-deficient silicon oxide layer tends to be yellowish in visible light. On the other hand, in the case where the multilayer film includes a metal oxide layer containing Mo and Nb, yellowing can be prevented even in the case where the multilayer film includes an oxygen-deficient silicon oxide layer.

In addition, in the case where the metal oxide layer is mainly formed of the above mixed oxide, a content of at least one element in the group B (hereinafter, referred to as a group B content) contained in the mixed oxide is preferably less than 80 mass % with respect to a total of at least one element in the group A contained in the mixed oxide and at least one element in the group B contained in the mixed oxide, from the viewpoint of reducing the b* value of the transparent substrate with a multilayer film to 5 or less. The group B content is more preferably 70 mass % or less, and still more preferably 60 mass % or less. In addition, a lower limit of the group B content is not particularly limited, and is preferably 10 mass % or more, for example.

The dielectric layer 32 preferably has a refractive index of 1.8 to 2.3 at a wavelength of 550 nm from the viewpoint of keeping a refractive index difference from the dielectric layer 34 in an appropriate range and obtaining preferred low reflection characteristics.

The dielectric layer 32 preferably has an extinction coefficient k of greater than 0.004, and more preferably 0.01 or more at a wavelength of 550 nm. In addition, the extinction coefficient k of the dielectric layer 32 is preferably 3 or less, more preferably 1 or less, and still more preferably 0.38 or less.

In the case where the extinction coefficient k is greater than 0.004, a desired light absorption rate can be achieved with an appropriate number of layers. In addition, in the case where the extinction coefficient k is 3 or less, it is relatively easy to achieve both the reflection color and the transmittance. A method of adjusting the extinction coefficient k of the dielectric layer 32 is not particularly limited, and for example, in the case where the dielectric layer 32 is a metal oxide layer, the extinction coefficient k changes depending on the type of the contained element and a degree of oxidation thereof. Typically, in the case where a degree of oxidation of a metal oxide is relatively large or the metal oxide is completely oxidized, the extinction coefficient k tends to be small, and in the case where the degree of oxidation of the metal oxide is relatively small, the extinction coefficient k tends to be large.

In the first aspect, the multilayer film may have a laminated structure in which three or more layers having refractive indices different from each other are laminated. In this case, it is not necessary for all layers to have different refractive indices. For example, in the case of a three-layer laminated structure, it can be a three-layer laminated structure including a low refractive index layer, a high refractive index layer, and a low refractive index layer, or a three-layer laminated structure including a high refractive index layer, a low refractive index layer, and a high refractive index layer. In the former case, the two low refractive index layers may have the same refractive index, and in the latter case, the two high refractive index layers may have the same refractive index. For example, in the case of a four-layer laminated structure, it can be a four-layer laminated structure including a low refractive index layer, a high refractive index layer, a low refractive index layer, and a high refractive index layer, or a four-layer laminated structure including a high refractive index layer, a low refractive index layer, a high refractive index layer, and a low refractive index layer. In this case, at least one of the two low refractive index layers and the two high refractive index layers may have the same refractive index. Note that the number of laminations constituting the multilayer film and the film thickness of each layer can be appropriately changed according to desired optical characteristics and the like.

In the first aspect, in the case where the multilayer film includes a plurality of silicon oxide layers, it is sufficient that at least one layer has a refractive index n of 1.460≤n<1.478 at a wavelength of 550 nm. As described above, the multilayer film preferably includes the silicon oxide layer and further includes a metal oxide layer, but the multilayer film may have a configuration including other layers in addition to these layers.

However, in the multilayer film, an outermost layer is preferably the silicon oxide layer. This is because in the case where the outermost layer is the silicon oxide layer in order to obtain low reflection characteristics, the preparation thereof is relatively easy. In addition, in the case of forming an antifouling film to be described later, it is preferable to form the antifouling film on the silicon oxide layer from the viewpoint of bonding properties related to durability of the antifouling film.

In the case where the outermost layer of the multilayer film is the silicon oxide layer, n of the silicon oxide layer on the outermost surface is also preferably 1.460≤n<1.478. On the other hand, it is also preferable to provide a silicon oxide layer having a relatively large n on the outermost surface, and in this case, it is also preferable that 1.478≤n. This is because transmission of an oxygen gas or water vapor into the multilayer film tends to occur from the surface side of the multilayer film, n of the silicon oxide layer on the outermost surface is relatively large, that is, the degree of oxidation is relatively small, making the oxygen gas or water vapor less likely to transmit, and thereby the change in transmittance caused by transmission of the oxygen gas or water vapor into the multilayer film can be more easily prevented. In this case, an upper limit of n is preferably less than 1.6, more preferably 1.481 or less, and still more preferably 1.480 or less, from the viewpoint of sufficiently preventing light reflection, for example.

As a specific configuration example, for example, in the case where the multilayer film includes a plurality of silicon oxide layers, n of at least one layer of the silicon oxide layers other than the outermost surface is 1.460≤n<1.478, and n of the silicon oxide layer on the outermost surface is relatively large, preferably 1.478≤n<1.6, more preferably 1.478≤n<1.481, and still more preferably 1.478≤n<1.480.

Alternatively, the silicon oxide layer on the outermost surface has a configuration in which two types of silicon oxide layers having different n are laminated, n of the silicon oxide layer on an interface side with the lower layer is 1.460≤n<1.478, and n of the silicon oxide layer on the surface side is relatively large, preferably 1.478≤n<1.6, more preferably 1.478≤n<1.481, and still more preferably 1.478≤n<1.480.

Second Aspect

A multilayer film in a transparent substrate with a multilayer film according to the second aspect of the present embodiment preferably has the following configuration.

The multilayer film in the second aspect includes one or more first metal oxide layers, at least one layer of the one or more first metal oxide layers is sandwiched and laminated between two second metal oxide layers, and the second metal oxide layers sandwiching the first metal oxide layer each have a film thickness of 8 nm or more, in which the one or more first metal oxide layers are each a layer being mainly formed of a mixed oxide comprising Mo and Nb and having an extinction coefficient k of greater than at a wavelength of 550 nm, and the second metal oxide layers are each a layer being mainly formed of a mixed oxide comprising Mo and Nb and having an extinction coefficient k of 0.004 or less at the wavelength of 550 nm.

Figure 2:
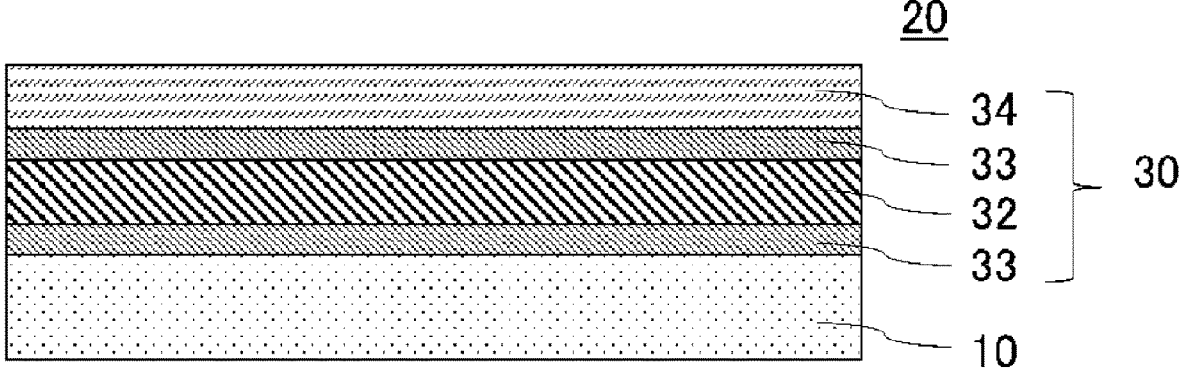
FIG. 2 is a cross-sectional view schematically showing one configuration example of a transparent substrate with a multilayer film according to a second aspect.

FIG. 2 is a cross-sectional view schematically showing one configuration example of the transparent substrate with a multilayer film according to the second aspect. In the transparent substrate with a multilayer film 20 in FIG. 2, the multilayer film 30 is formed on the transparent substrate 10. The multilayer film 30 shown in FIG. 1 has a laminated structure in which two dielectric layers 32 and 34 are laminated as layers having refractive indices different from each other. In the case where the dielectric layers 32 and 34 having refractive indices different from each other are laminated, light reflection can be prevented. In the example in FIG. 2, the dielectric layer 32 is a high refractive index layer and the dielectric layer 34 is a low refractive index layer. In the second aspect, the dielectric layer 32 is a layer mainly formed of a mixed oxide containing Mo and Nb, and having an extinction coefficient k of greater than at a wavelength of 550 nm, that is, the first metal oxide layer. The dielectric layer 32, which is the first metal oxide layer, is sandwiched and laminated between dielectric layers 33, which are the second metal oxide layers. Each of the second metal oxide layers (dielectric layers 33) sandwiching the first metal oxide layer has a film thickness of 8 nm or more.

The first metal oxide layer is mainly formed of a mixed oxide containing Mo and Nb, and has an extinction coefficient k of greater than 0.004 at a wavelength of 550 nm. In the first metal oxide layer, the extinction coefficient k is preferably 0.01 or more, and more preferably 0.04 or more at a wavelength of 550 nm. In addition, in the first metal oxide layer, the extinction coefficient k is preferably 3 or less, more preferably 1 or less, and still more preferably 0.38 or less at a wavelength of 550 nm.

In the case where the extinction coefficient k is greater than 0.004, a desired light absorption rate can be achieved with an appropriate number of layers. In addition, in the case where the extinction coefficient k is 3 or less, it is relatively easy to achieve both the reflection color and the transmittance.

The second metal oxide layer is mainly formed of a mixed oxide containing Mo and Nb, and has an extinction coefficient k of 0.004 or less at a wavelength of 550 nm. In the second metal oxide layer, the extinction coefficient k is preferably 0.004 or less at a wavelength of 550 nm. A lower limit of the extinction coefficient k at a wavelength of 550 nm is not particularly limited, and is preferably 0.000 or more, and more preferably 0.0001 or more, for example.

In the first metal oxide layer and the second metal oxide layer, the extinction coefficient k changes depending on the type of the contained element and a degree of oxidation thereof. The adjustment method thereof is not particularly limited, and for example, in the case where the first metal oxide layer is mainly formed of a mixed oxide $MoNbO_y$ containing Mo and Nb, a degree of oxidation of $MoNbO_y$ is made relatively small, and thereby the extinction coefficient k can easily be made greater than 0.004, which is preferred. In addition, in the case where the second metal oxide layer is mainly formed of a mixed oxide $MoNbO_y$ containing Mo and Nb, a degree of oxidation of $MoNbO_y$ is made relatively large or $MoNbO_y$ is completely oxidized, and thereby the extinction coefficient k can easily be made 0.004 or less, which is preferred.

In the second aspect, in the case where at least one layer of the first metal oxide in the multilayer film is sandwiched and laminated between the two second metal oxide layers, and each of the second metal oxide layers sandwiching the first metal oxide layer has a film thickness of 8 nm or more, the change in transmittance of the multilayer film under a high-temperature environment and a high-temperature and high-humidity environment can be prevented. The reason for this is not clear, but it is presumed that in the case where a configuration in which the first metal oxide layer is sandwiched between the second metal oxide layers having a relatively high degree of oxidation is included, for example, in a redox reaction in the multilayer film described above, the reaction is prevented and the change in transmittance is also prevented since a reduction reaction species is different from the one in the related art.

A content of at least one element in a group B (referred to as a group B content) consisting of Si, Nb, Ti, Zr, Ta, Al, Sn, and In is preferably less than 80 mass % with respect to a total of at least one element in a group A consisting of Mo and W and the at least one element in the group B contained in the first metal oxide layer, from the viewpoint of reducing the b* value of the transparent substrate with a multilayer film to 5 or less. The group B content is more preferably 70 mass % or less, and still more preferably 60 mass % or less. In addition, a lower limit of the group B content is not particularly limited, and is preferably 10 mass % or more, for example. The group B content is preferably in the same range in the second metal oxide layer.

The first metal oxide layer is preferably amorphous. In the case where the first metal oxide layer is amorphous, it can be prepared at a relatively low temperature, so that in the case where the transparent substrate is a resin substrate or the like, the transparent substrate can be prevented from being damaged by heat. For the same reason, the second metal oxide layer is also preferably amorphous.

The dielectric layer 32 preferably has a refractive index of 1.8 to 2.3 at a wavelength of 550 nm from the viewpoint of keeping a refractive index difference from the dielectric layer 34 in an appropriate range and obtaining preferred low reflection characteristics.

A film thickness of the first metal oxide layer is not particularly limited, and is preferably 10 nm or more, and more preferably 40 nm or more, from the viewpoint of low reflection characteristics, for example. In addition, a total film thickness of the multilayer film including the film thickness of the first metal oxide layer is preferably 1000 nm or less, and more preferably 800 nm or less, from the viewpoint of productivity.

A film thickness of the second metal oxide layer is also not particularly limited, and the film thickness of each of the second metal oxide layers sandwiching the first metal oxide is 8 nm or more, preferably 10 nm or more, and more preferably 50 nm or more. An upper limit of the film thickness of the second metal oxide layer is not particularly limited, and is preferably 100 nm or less, for example.

From the viewpoint of low reflection characteristics, the multilayer film preferably further includes a silicon oxide layer mainly formed of $SiO_x$. For example, the dielectric layer 34 in FIG. 2 is preferably the silicon oxide layer.

The dielectric layer 34 preferably has a refractive index n of 1.3 to 1.6 at a wavelength of 550 nm, from the viewpoint of low reflection characteristics.

In the second aspect, the multilayer film may have a laminated structure in which three or more layers having refractive indices different from each other are laminated. In this case, it is not necessary for all layers to have different refractive indices. For example, in the case of a three-layer laminated structure, it can be a three-layer laminated structure including a low refractive index layer, a high refractive index layer, and a low refractive index layer, or a three-layer laminated structure including a high refractive index layer, a low refractive index layer, and a high refractive index layer. In the former case, the two low refractive index layers may have the same refractive index, and in the latter case, the two high refractive index layers may have the same refractive index. For example, in the case of a four-layer laminated structure, it can be a four-layer laminated structure including a low refractive index layer, a high refractive index layer, a low refractive index layer, and a high refractive index layer, or a four-layer laminated structure including a high refractive index layer, a low refractive index layer, a high refractive index layer, and a low refractive index layer. In this case, at least one of the two low refractive index layers and the two high refractive index layers may have the same refractive index. Note that the number of laminations constituting the multilayer film and the film thickness of each layer can be appropriately changed according to desired optical characteristics and the like.

In the second aspect, as described above, the multilayer film preferably includes the one or more first metal oxide layers and further includes the one or more silicon oxide layers, but the multilayer film may have a configuration including other layers, in addition to these layers and the second metal oxide layers. In addition, in the second aspect, the multilayer film may include at least one silicon oxide layer, and at least one layer of the at least one silicon oxide layer may have a refractive index n of $1.460 \leq n < 1.478$ at a wavelength of 550 nm. That is, the multilayer film may have a configuration that satisfies the second aspect and the first aspect at the same time.

However, in the multilayer film, an outermost layer is preferably the silicon oxide layer. This is because in the case where the outermost layer is the silicon oxide layer in order to obtain low reflection characteristics, the preparation thereof can be relatively easy. In addition, in the case of forming an antifouling film to be described later, it is preferable to form the antifouling film on the silicon oxide layer from the viewpoint of bonding properties related to durability of the antifouling film.

Note that a halftone mask for use in the semiconductor production field is known as a light transmitting film having a light absorption ability and an insulating property. As the halftone mask, an oxygen-deficient film such as a $Mo—SiO_x$ film containing a small amount of Mo is used. In addition, as the light transmitting film having a light absorption ability and an insulating property, a narrow bandgap film for use in the semiconductor production field is known.

However, these films have a high ability to absorb light on the short wavelength side of visible light, so that the transmitted light is yellowish. Therefore, these films are not suitable for a cover glass for an image display device.

The composition and optical constant of each layer constituting the multilayer film in the first aspect and the second aspect can be calculated from results of identification by XPS (X-ray photoelectron spectroscopy) or SIMS (secondary ion mass spectrometry) and measurement of optical characteristics in the state where the multilayer film is formed. Note that in the case where film formation conditions for each layer can be specified, the optical constant of each layer can also be calculated by forming a single film, i.e., a film consisting of only one layer, on a transparent substrate under the same conditions as the film formation conditions for each layer, and performing spectroscopic measurement on the single film.

Hereinafter, the transparent substrate with a multilayer film according to the present embodiment will be further described. The subsequent configuration is a configuration common to the first aspect and the second aspect.
(Transparent Substrate)

The transparent substrate is not particularly limited as long as it is a transparent substrate having an excellent translucency, and a material having a refractive index of 1.4 or more and 1.7 or less is preferred. This is because, when optically bonding a display, a touch panel, or the like, reflection on a bonding surface can be sufficiently prevented.

The transparent substrate is preferably a glass substrate or a resin substrate. The transparent substrate may be a laminate including a glass and a resin substrate.

As the glass substrate, a glass having various compositions can be used. For example, the glass used in the present embodiment preferably contains sodium and preferably has a composition that can be strengthened by molding and a chemical strengthening treatment. Specific examples thereof include an aluminosilicate glass, a soda lime glass, a borosilicate glass, a lead glass, an alkali barium glass, and an aluminoborosilicate glass.

A thickness of the glass substrate is not particularly limited, and is generally preferably 5 mm or less, and more preferably 3 mm or less, in order to effectively perform the chemical strengthening treatment in the case where the chemical strengthening treatment is performed.

The glass in the glass substrate or the laminate including a glass and a resin substrate is preferably a chemically strengthened glass in order to increase strength of the cover glass. Note that in the case where the glass substrate is subjected to an anti-glare treatment, the chemical strengthening is preferably performed after the anti-glare treatment and before forming the multilayer film.

It is preferable that a main surface of the glass substrate where the multilayer film is provided is subjected to the anti-glare treatment. A method of the anti-glare treatment is not particularly limited, and a method of subjecting the main surface of the glass to a surface treatment to form desired unevenness can be used. Specifically, a method of chemically treating the main surface of the glass substrate, for example, a method of applying a frost treatment, can be used. In the frost treatment, for example, a glass substrate to be treated can be immersed in a mixed solution containing hydrogen fluoride and ammonium fluoride, and the immersed surface can be subjected to a chemical surface treatment. In addition to such chemical treatment methods, for example, a method by a so-called sandblast treatment in which a crystalline silicon dioxide powder, a silicon carbide powder, or the like is blown onto the surface of the glass substrate with pressurized air, or a method by a physical treatment such as polishing with a brush to which a crystalline silicon dioxide powder, a silicon carbide powder or the like adheres is moistened with water can also be used.

The resin substrate is preferably a resin film. As the resin film, a thermoplastic resin or a thermosetting resin can be used. Examples of the thermoplastic resin or the thermosetting resin include a polyvinyl chloride resin, a polyethylene resin, a polypropylene resin, a polystyrene resin, a polyvinyl acetate resin, a polyester resin, a polyurethane resin, a cellulose-based resin, an acrylic resin, an AS (acrylonitrile-styrene) resin, an ABS (acrylonitrile-butadiene-styrene) resin, a fluorine-based resin, a thermoplastic elastomer, a polyamide resin, a polyimide resin, a polyacetal resin, a polycarbonate resin, a modified polyphenylene ether resin, a polyethylene terephthalate resin, a polybutylene terephthalate resin, a polylactic acid-based resin, a cyclic polyolefin resin, and a polyphenylene sulfide resin. Among these, a cellulose-based resin is preferred, and a triacetyl cellulose resin, a polycarbonate resin, and a polyethylene terephthalate resin are more preferred. These resins may be used alone or in combination of two or more types thereof.

A thickness of the resin film is not particularly limited, and is preferably 20 μm to 150 μm, and more preferably 40 μm to 80 μm.

In the case where the resin film is used as the transparent substrate 10, as one embodiment, a configuration in which a hard coat layer (not shown) is provided on the transparent substrate 10, and the multilayer film 30 is provided thereon may be used.

Further, as another embodiment, the main surface of the resin film where the multilayer film is provided is also preferably subjected to the anti-glare treatment. In this case, a configuration in which an anti-glare layer (not shown) is provided on the hard coat layer, and the multilayer film 30 is provided thereon may be used.

The hard coat layer can be applied by dissolving a polymer resin. The anti-glare layer increases a haze and imparts an anti-glare property by forming an uneven shape on one surface of the film. Similar to the hard coat layer, the anti-glare layer can be applied by dissolving a polymer resin. An anti-glare layer composition constituting the anti-glare layer contains at least a particulate substance having an anti-glare property per se dispersed in a solution in which a polymer resin is dissolved as a binder.

Examples of the particulate substance having an anti-glare property include inorganic fine particles such as silica, clay, talc, calcium carbonate, calcium sulfate, barium sulfate, aluminum silicate, titanium oxide, synthetic zeolite, alumina, and smectite, and organic fine particles made of a styrene resin, a urethane resin, a benzoguanamine resin, a silicone resin, an acrylic resin, or the like.

In addition, for the polymer resin as a binder for the above hard coat layer and the above anti-glare layer, for example, polymer resins such as a polyester-based resin, an acrylic resin, an acrylic urethane-based resin, a polyester acrylate-based resin, a polyurethane-based acrylate resin, and an epoxy acrylate-based resin, and a urethane-based resin can be used.

(Method for Producing Transparent Substrate with Multilayer Film)

The above multilayer film can be formed on the main surface of the transparent substrate using a known film-forming method such as a sputtering method, a vacuum deposition method, or a coating method. That is, it is preferable to form each layer constituting the multilayer film on the main surface of the transparent substrate according to a lamination order by using a known film-forming method such as the sputtering method, the vacuum deposition method, or the coating method.

Examples of the sputtering method for forming a dielectric multilayer film include a reactive sputtering method using DC sputtering, DC pulse sputtering, or AC sputtering, and a digital sputtering method.

For example, the reactive sputtering method is a method of forming a dielectric continuous film of an oxide or a nitride by reacting a reactive gas such as oxygen, carbon dioxide, or nitrogen optionally contained in a rare gas such as argon when gas ion atoms collide with a surface of a dielectric material or a metal material, and spouted sputtered atoms are deposited.

For example, the digital sputtering method is a method of repeatedly forming a metal oxide thin film in the same chamber, including a step of first forming a metal ultra-thin film by sputtering, and then oxidizing the film by irradiation with oxygen plasma, oxygen ions, or oxygen radicals, unlike the reactive sputtering in which the above dielectric is directly formed.

In this case, since film-forming molecules are metals when deposited on a substrate, it is presumed to be more ductile than a case of depositing a metal oxide. Therefore, it is conceivable that even in the case where the energy is the same, rearrangement of the film-forming molecules is likely to occur, and as a result, a dense and smooth film can be formed.

A film-forming method for the silicon oxide layer and the metal oxide layer is also not particularly limited, and the layers can be formed by the above methods or the like. Examples of a method for adjusting the degree of oxidation of each layer include, for example in the case of the digital sputtering method, adjusting a flow rate of the oxygen gas during oxidation or an intensity of a power applied to the oxygen gas.

From the viewpoint of preventing the change in transmittance due to transmission of an oxygen gas or water vapor from the outside under a high-temperature environment and a high-temperature and high-humidity environment, it is preferable that a density of each layer in the multilayer film be greater than a certain level. A method for adjusting the density of each layer is not particularly limited, and examples thereof include, for example in the case of the digital sputtering method, adjusting a pressure during film formation. More specifically, in the case of the digital sputtering method, the pressure for forming the silicon oxide layer is, for example, preferably 0.05 Pa to 1.0 Pa, and the pressure for forming the metal oxide layer is, for example, preferably 0.05 Pa to 1.0 Pa.

Note that in the transparent substrate with a multilayer film according to the present embodiment, the multilayer film may be provided on or above at least one main surface of the transparent substrate, or may be provided on or above both main surfaces of the transparent substrate, if necessary.

(Antifouling Film)

The transparent substrate with a multilayer film according to the present embodiment may further include an antifouling film (also referred to as an "anti finger print (AFP) film") on or above the multilayer film, from the viewpoint of protecting the outermost surface of the film. The antifouling film can contain, for example, a fluorine-containing organosilicon compound. The fluorine-containing organosilicon compound is not particularly limited as long as it can impart antifouling properties, water repellency, and oil repellency, and examples thereof include a fluorine-containing organosilicon compound having one or more groups selected from the group consisting of a perfluoropolyether group, a perfluoroalkylene group, and a perfluoroalkyl group. Note that the perfluoropolyether group is a divalent group having a structure in which perfluoroalkylene groups and etheric oxygen atoms are alternately bonded.

As a commercially available fluorine-containing organosilicon compound having one or more groups selected from the group consisting of a perfluoropolyether group, a perfluoroalkylene group, and a perfluoroalkyl group, KP-801 (trade name, manufactured by Shin-Etsu Chemical Co., Ltd.), KY-178 (trade name, manufactured by Shin-Etsu Chemical Co., Ltd.), KY-130 (trade name, manufactured by Shin-Etsu Chemical Co., Ltd.), KY-185 (trade name, manufactured by Shin-Etsu Chemical Co., Ltd.), OPTOOL (registered trademark) DSX and OPTOOL AES (trade names, both manufactured by DAIKIN INDUSTRIES, LTD.), or the like can be used preferably.

The antifouling film is preferably laminated on or above the above multilayer film which is an antireflection film. In the case where a multilayer film is formed on both main surfaces of a glass substrate or a resin substrate, the antifouling film can be formed on both multilayer films, or the antifouling film may be laminated only on one of the surfaces. This is because the antifouling film only needs to be provided at places where there is a possibility of contact with human hands, and the antifouling film can be selected according to the application.

The transparent substrate with a multilayer film according to the present embodiment is suitable as a cover glass for an image display device, particularly a cover glass for an image display device mounted on a vehicle such as an image display device for a navigation system mounted on a vehicle. That is, the present invention also relates to an image display device including the above transparent substrate with a multilayer film. In the image display device according to the present embodiment, preferred aspects of the transparent substrate with a multilayer film are the same as described above.

EXAMPLES

The present invention will be specifically described below with reference to Examples, but the present invention is not limited thereto. Examples 2 to 5 and Examples 10 to 12 are inventive examples, and Example 1 and Examples 6 to 9 are comparative examples.

A multilayer film was formed on one main surface of a transparent substrate by the following method to prepare a transparent substrate with a multilayer film. A 40 μm-thick triacetyl cellulose resin film (hereinafter referred to as a TAC film) was used as the transparent substrate.

In each example, the metal oxide layer was formed by the following method. Using a target obtained by mixing niobium and molybdenum in a weight ratio of 60:40 and sintering, a $MoNbO_y$ layer was formed as the metal oxide layer by using a digital sputtering method by repeatedly forming a metal film having a small film thickness with an argon gas and immediately thereafter oxidizing the metal film with an oxygen gas at a high speed.

In each example, the silicon oxide layer was formed by the following method. Using a silicon target, a silicon oxide film was formed by using a digital sputtering method by repeatedly forming a silicon film with an argon gas and immediately thereafter oxidizing the silicon film with an oxygen gas at a high speed to form a silicon oxide layer containing a silicon oxide [silica ($SiO_x$)].

Example 1

Dielectric layers (1) to (4) shown below were formed as a multilayer film in this order on one main surface of a transparent substrate subjected to an anti-glare treatment.
  Dielectric layer (1): metal oxide layer ($MoNbO_y$ layer, 9 nm)
  Dielectric layer (2): silicon oxide layer ($SiO_x$ layer, 36 nm)
  Dielectric layer (3): metal oxide layer ($MoNbO_y$ layer, 105 nm)
  Dielectric layer (4): silicon oxide layer ($SiO_x$ layer, 80 nm)

Here, during formation of the metal oxide layers, a discharge power applied to the target ("DC" in Table 1) was 3.4 kW, an argon gas flow rate (Ar) was 300 sccm, an oxygen gas flow rate ($O_2$) was 1200 sccm, and an ECR discharge power was 900 W. At this time, the pressure was 0.36 Pa. During formation of the silicon oxide layers, the discharge power applied to the target was 6.0 kW, the argon gas flow rate (Ar) was 100 sccm, the oxygen gas flow rate ($O_2$) was 900 sccm, and the ECR discharge power was 1400 W. At this time, the pressure was Pa.

Next, a 4-nm thick antifouling film (AFP) was formed on the dielectric layer (4) by the following method to obtain a transparent substrate with a multilayer film.

KY-185 (trade name, manufactured by Shin-Etsu Chemical Co., Ltd.) as a fluorine-containing organosilicon compound was charged into a metal crucible (evaporation source) and heated to evaporate at 230 to 350° C. The evaporated particles evaporated and diffused into a vacuum chamber in which the substrate was installed, and adhered on the surface of the substrate. A 4-nm thick antifouling film was formed while a vapor deposition rate was monitored by controlling with a crystal oscillator.

Examples 2 to 9

Dielectric layers (1) to (4) were formed as a multilayer film in the same manner as in Example 1, except that film formation conditions for the metal oxide layers ($MoNbO_y$ layers) and the silicon oxide layers ($SiO_x$ layers) were as shown in Table 1. Next, a 4-nm antifouling film was formed thereon in the same manner as described above to obtain a transparent substrate with a multilayer film.

Example 10

Dielectric layers (1) to (4) and an antifouling film were formed and a transparent substrate with a multilayer film was obtained in the same manner as in Example 1, except that film formation conditions for the metal oxide layers and the silicon oxide layers were changed as shown in Table 1. However, the film formation conditions for the dielectric layer (2) were conditions in the upper stage in the "$SiO_x$" column and the "Example 10" row in Table 1, and the film formation conditions for the dielectric layer (4) were conditions in the lower stage in the "$SiO_x$" column and the "Example 10" row in Table 1. That is, in Example 10, the dielectric layers (1) to (4) shown below were formed in this order as a multilayer film. Next, a 4-nm antifouling film was formed thereon in the same manner as described above to obtain a transparent substrate with a multilayer film.
  Dielectric layer (1): metal oxide layer ($MoNbO_y$ layer, 9 nm)
  Dielectric layer (2): silicon oxide layer ($SiO_{x1}$ layer, 36 nm, film formation conditions in upper stage)
  Dielectric layer (3): metal oxide layer ($MoNbO_y$ layer, 105 nm)
  Dielectric layer (4): silicon oxide layer ($SiO_{x2}$ layer, 80 nm, film formation conditions in lower stage)

Example 11

Dielectric layers (1) to (3) were formed in the same manner as in Example 1, except that film formation conditions for the metal oxide layers and the silicon oxide layers were changed as shown in Table 1. However, the film formation conditions for the dielectric layer (2) were conditions in the upper stage in the "$SiO_x$" column and the "Example 11" row in Table 1. Next, a 40-nm silicon oxide layer was formed as a dielectric layer (4-1) under conditions in the upper stage in the "$SiO_x$" column and the "Example 11" row in Table 1, and next, a 40-nm silicon oxide layer was formed as a dielectric layer (4-2) under conditions in the lower stage in the "$SiO_x$" column and the "Example 11" row in Table 1. That is, in Example 11, the dielectric layers (1), (2), (3), (4-1), and (4-2) shown below were formed in this order as a multilayer film. Next, a 4-nm antifouling film was formed thereon in the same manner as described above to obtain a transparent substrate with a multilayer film.

Dielectric layer (1): metal oxide layer ($MoNbO_y$ layer, 9 nm)

Dielectric layer (2): silicon oxide layer ($SiO_{x1}$ layer, 36 nm, film formation conditions in upper stage)

Dielectric layer (3): metal oxide layer ($MoNbO_y$ layer, 105 nm)

Dielectric layer (4-1): silicon oxide layer ($SiO_{x1}$ layer, 40 nm, film formation conditions in upper stage)

Dielectric layer (4-2): silicon oxide layer ($SiO_{x2}$ layer, 40 nm, film formation conditions in lower stage)

Example 12

Dielectric layers (1) and (2) were formed in the same manner as in Example 1, except that film formation conditions for the metal oxide layers and the silicon oxide layers were changed as shown in Table 1. However, the dielectric layer (1) was formed under conditions in the upper stage in the "$MoNbO_y$" column and the "Example 12" row in Table 1. Next, a 10-nm metal oxide layer was formed as a dielectric layer (3'-1) in the same method as described above, except that conditions in the middle stage in the "$MoNbO_y$" column and the "Example 12" row in Table 1 were used, then a 85-nm metal oxide layer was formed as a dielectric layer (3) under conditions shown in the lower stage in the "$MoNbO_y$" column and the "Example 12" row in Table 1, a 10-nm metal oxide layer was formed thereon again as a dielectric layer (3'-2) under the conditions in the middle stage in the "$MoNbO_y$" column and the "Example 12" row in Table 1, and a 80-nm silicon oxide layer was formed as a dielectric layer (4) under the film formation conditions shown in Table 1. That is, in Example 12, the dielectric layers (1), (2), (3'-1), (3), (3'-2), and (4) shown below were formed in this order as a multilayer film. Next, a 4-nm antifouling film was formed thereon in the same manner as described above to obtain a transparent substrate with a multilayer film.

Dielectric layer (1): metal oxide layer ($MoNbO_{y1}$ layer, 9 nm, film formation conditions in upper stage)

Dielectric layer (2): silicon oxide layer ($SiO_x$ layer, 36 nm)

Dielectric layer (3'-1): metal oxide layer ($MoNbO_{y2}$ layer, 10 nm, film formation conditions in middle stage)

Dielectric layer (3): metal oxide layer ($MoNbO_{y3}$ layer, 85 nm, film formation conditions in lower stage)

Dielectric layer (3'-2): metal oxide layer ($MoNbO_{y2}$ layer, 10 nm, film formation conditions in middle stage)

Dielectric layer (4): silicon oxide layer ($SiO_x$ layer, 80 nm)

(Optical Constant)

A single film (a film consisting of only one layer) made of a silicon oxide layer or a metal oxide layer having a film thickness of 300 nm or more was prepared on a glass substrate under the same film formation conditions as in the case where each dielectric layer constituting the multilayer film in each example was formed, and spectroscopic measurement was performed. Optical constants were calculated from the obtained spectral spectrum. Table 1 shows the refractive index n at a wavelength of 550 nm and the extinction coefficient k at a wavelength of 550 nm as the optical constants of the metal oxide layer ($MoNbO_y$ layer) in each example. In addition, Table 1 shows the refractive index n at a wavelength of 550 nm as the optical constant of the silicon oxide layer ($SiO_x$ layer) in each example. Note that the extinction coefficient k of the silicon oxide layer at a wavelength of 550 nm was almost 0 in all examples.

(Humidity and Heat Resistance Test)

Using the obtained transparent substrate with a multilayer film, a spectral transmittance was measured by a spectrophotometer (trade name: Solid Spec-3700, manufactured by Shimadzu Corporation) for the transparent substrate with a multilayer film before being charged in a reliability test chamber at a temperature of 85° C. and a humidity of 85% RH, and for the transparent substrate with a multilayer film 500 hours after being charged in the reliability test chamber, the luminous transmittance (stimulus value Y specified in JIS Z 8701:1999) was obtained by calculation, and an amount of change in luminous transmittance change amount $\Delta$ Tv was obtained based on the luminous transmittance before charging and the luminous transmittance after 500 hours. In the case where the absolute value of $\Delta$ Tv was 2.0 or less, it was evaluated as "acceptable", and in the case where the absolute value of $\Delta$ Tv was greater than 2.0, it was evaluated as "unacceptable".

(Heat Resistance Test)

Using the obtained transparent substrate with a multilayer film, a spectral transmittance was measured by a spectrophotometer (trade name: Solid Spec-3700, manufactured by Shimadzu Corporation) for the transparent substrate with a multilayer film before being charged in a reliability test chamber at a temperature of 95° C., and for the transparent substrate with a multilayer film 500 hours after being charged in the reliability test chamber, the luminous transmittance (stimulus value Y specified in JIS Z 8701:1999) was obtained by calculation, and an amount of change in luminous transmittance change amount $\Delta$ Tv was obtained based on the luminous transmittance before charging and the luminous transmittance after 500 hours. In the case where the absolute value of $\Delta$ Tv was 2.0 or less, it was evaluated as "acceptable", and in the case where the absolute value of $\Delta$ Tv was greater than 2.0, it was evaluated as "unacceptable".

In addition, in the "determination" column of Table 1, examples in which both the result of the humidity and heat resistance test and the result of the heat resistance test were acceptable were evaluated as "acceptable", and examples in which one or both were not acceptable were evaluated as "unacceptable".

TABLE 1

| | | MoNbO$_y$ | | |
| --- | --- | --- | --- | --- |
| | Configuration | DC (kW) | Ar (sccm) | O$_2$ (sccm) |
| Example 1 | TAC/MoNbO$_y$/SiO$_x$/MoNbO$_y$/SiO$_x$/AFP | 3.4 | 300 | 1200 |
| Example 2 | TAC/MoNbO$_y$/SiO$_x$/MoNbO$_y$/SiO$_x$/AFP | 3.4 | 300 | 1200 |
| Example 3 | TAC/MoNbO$_y$/SiO$_x$/MoNbO$_y$/SiO$_x$/AFP | 3.4 | 300 | 1200 |
| Example 4 | TAC/MoNbO$_y$/SiO$_x$/MoNbO$_y$/SiO$_x$/AFP | 3.4 | 300 | 1200 |
| Example 5 | TAC/MoNbO$_y$/SiO$_x$/MoNbO$_y$/SiO$_x$/AFP | 3.4 | 300 | 1200 |
| Example 6 | TAC/MoNbO$_y$/SiO$_x$/MoNbO$_y$/SiO$_x$/AFP | 3.4 | 300 | 1200 |
| Example 7 | TAC/MoNbO$_y$/SiO$_x$/MoNbO$_y$/SiO$_x$/AFP | 3.4 | 300 | 1200 |
| Example 8 | TAC/MoNbO$_y$/SiO$_x$/MoNbO$_y$/SiO$_x$/AFP | 3.4 | 120 | 810 |
| Example 9 | TAC/MoNbO$_y$/SiO$_x$/MoNbO$_y$/SiO$_x$/AFP | 3.4 | 120 | 1200 |
| Example 10 | TAC/MoNbO$_y$/SiO$_{x1}$ (n 1.476)/ MoNbO$_y$/SiO$_{x2}$ (n 1.479)/AFP | 3.4 | 120 | 810 |
| Example 11 | TAC/MoNbO$_y$/SiO$_{x1}$ (n 1.476)/ MoNbO$_y$/SiO$_{x1}$ (n 1.476__40 nm)/ SiO$_{x2}$ (n 1.479__40 nm)/AFP | 3.4 | 120 | 810 |
| Example 12 | TAC/MoNbO$_{y1}$ (k 0.022)/SiO$_x$ (n 1.479)/ MoNbO$_{y2}$ (k 0.000__10 nm)/MoNbO$_{y3}$ (k 0.029)/MoNbO$_{y2}$ (k 0.000__10 nm)/ SiO$_x$ (n 1.479)/AFP | 3.4 3.4 3.4 | 120 120 120 | 1200 810 780 |

| | MoNbO$_y$ | | SiO$_x$ | | | | |
| --- | --- | --- | --- | --- | --- | --- | --- |
| | ECR (W) | Optical constant at 550 nm | DC (kW) | Ar (sccm) | O$_2$ (sccm) | ECR (W) | Optical constant at 550 nm |
| Example 1 | 900 | n 2.276 k 0.022 | 6.0 | 100 | 900 | 1400 | 1.458 |
| Example 2 | 900 | n 2.276 k 0.022 | 6.0 | 100 | 900 | 800 | 1.476 |
| Example 3 | 900 | n 2.276 k 0.022 | 6.0 | 100 | 600 | 1400 | 1.464 |
| Example 4 | 900 | n 2.276 k 0.022 | 6.0 | 100 | 600 | 800 | 1.465 |
| Example 5 | 900 | n 2.276 k 0.022 | 6.0 | 100 | 350 | 800 | 1.474 |
| Example 6 | 900 | n 2.276 k 0.022 | 6.0 | 100 | 200 | 800 | 1.479 |
| Example 7 | 900 | n 2.276 k 0.022 | 6.0 | 100 | 200 | 500 | 1.486 |
| Example 8 | 900 | n 2.277 k 0.021 | 6.0 | 100 | 500 | 200 | 1.479 |
| Example 9 | 900 | n 2.276 k 0.022 | 6.0 | 300 | 150 | 200 | 1.481 |
| Example 10 | 900 | n 2.277 k 0.021 | 6.0 6.0 | 100 150 | 900 500 | 800 200 | 1.476 1.479 |
| Example 11 | 900 | n 2.277 k 0.021 | 6.0 6.0 | 100 150 | 900 500 | 800 200 | 1.476 1.479 |
| Example 12 | 900 1200 900 | n 2.276 k 0.022 n 2.273 k 0.000 n 2.278 k 0.029 | 6.0 | 150 | 500 | 200 | 1.479 |

| | 85° C. 85% RH__500 h ΔTv ≤2.0 | 95° C.__500 h ΔTv ≤2.0 | Determination |
| --- | --- | --- | --- |
| Example 1 | Acceptable −0.6 | Unacceptable +2.2 | Unacceptable |
| Example 2 | Acceptable −0.5 | Acceptable +1.9 | Acceptable |
| Example 3 | Acceptable −0.7 | Acceptable −0.1 | Acceptable |
| Example 4 | Acceptable −1.4 | Acceptable +0.9 | Acceptable |
| Example 5 | Acceptable −1.9 | Acceptable −1.5 | Acceptable |
| Example 6 | Unacceptable −2.1 | Acceptable −1.6 | Unacceptable |
| Example 7 | Unacceptable −2.5 | Acceptable −1.8 | Unacceptable |
| Example 8 | Unacceptable −2.7 | Unacceptable −2.1 | Unacceptable |

US 12,631,794 B2

21

22

TABLE 1-continued

| Example 9 | Unacceptable −2.0 | Unacceptable +2.9 | Unacceptable |
| Example 10 | Acceptable −2.0 | Acceptable −1.0 | Acceptable |
| Example 11 | Acceptable −0.8 | Acceptable −0.7 | Acceptable |
| Example 12 | Acceptable −2.0 | Acceptable −1.3 | Acceptable |

As shown in Table 1, in the transparent substrate with a multilayer film in each of Examples 2 to 5 and Examples 10 to 12, which are inventive examples, the change in transmittance before and after the heat resistance test and the humidity and heat resistance test was relatively small, and prevention of the change in transmittance under a high-temperature environment and a high-temperature and high-humidity environment was excellent.

Although the present invention has been described in detail with reference to specific embodiments, it is apparent to those skilled in the art that various changes and modifications can be made without departing from the spirit and scope of the present invention. The present application is based on a Japanese Patent Application (No. 2021-030879) filed on Feb. 26, 2021, the contents of which are incorporated herein by reference.

REFERENCE SIGNS LIST

10: transparent substrate
20: transparent substrate with multilayer film
30 multilayer film
32, 33, 34: dielectric layer

What is claimed is:

1. A transparent substrate with a multilayer film comprising:
   a transparent substrate having two main surfaces; and
   a multilayer film obtained by laminating at least two or more layers having refractive indices different from each other, and disposed on or above at least one main surface of the transparent substrate, wherein
   the multilayer film comprises
      one or more silicon oxide layers;
      one or more first metal oxide layers; and
      at least two second metal oxide layers,
   at least one layer of the one or more first metal oxide layers is sandwiched and laminated between two second metal oxide layers, the second metal oxide layers sandwiching the first metal oxide layer each have a film thickness of 8 nm or more,
the one or more first metal oxide layers are each a layer being mainly formed of a mixed oxide comprising Mo and Nb and having an extinction coefficient k of 0.004 to 0.029 at a wavelength of 550 nm,
the second metal oxide layers are each a layer being mainly formed of a mixed oxide comprising Mo and Nb and having an extinction coefficient k of 0.004 or less at the wavelength of 550 nm, and
at least one layer of the one or more silicon oxide layers has a refractive index of $1.460 \leq n < 1.478$ at a wavelength of 550 nm.

2. The transparent substrate with a multilayer film according to claim 1, wherein
   the first metal oxide layer has a total content of Si, Nb, Ti, Zr, Ta, Al, Sn, and In of less than 80 mass % with respect to a total mass of Si, Nb, Ti, Zr, Ta, Al, Sn, In, Mo, and W contained in the first metal oxide layer.

3. The transparent substrate with a multilayer film according to claim 1, further comprising an antifouling film on or above the multilayer film.

4. The transparent substrate with a multilayer film according to claim 1, wherein the transparent substrate is a glass substrate or a resin substrate.

5. The transparent substrate with a multilayer film according to claim 1, wherein the transparent substrate is a laminate comprising a glass and a resin substrate.

6. The transparent substrate with a multilayer film according to claim 5, wherein the glass is chemically strengthened.

7. The transparent substrate with a multilayer film according to claim 1, wherein the transparent substrate is subjected to an anti-glare treatment on the main surface having the multilayer film.

8. An image display device comprising the transparent substrate with a multilayer film according to claim 1.

* * * * *